United States Patent [19]

Sims

[11] 3,920,473
[45] Nov. 18, 1975

[54] BATTERY PLATE GRIDS FOR LEAD-ACID BATTERIES

[75] Inventor: Ronald Ian Sims, Solihull, England

[73] Assignee: Joseph Lucas (Batteries) Limited, Birmingham, England

[22] Filed: Oct. 4, 1974

[21] Appl. No.: 512,309

Related U.S. Application Data

[63] Continuation of Ser. No. 315,402, Dec. 15, 1972, abandoned.

[30] Foreign Application Priority Data

Dec. 15, 1971   United Kingdom............... 58165/71

[52] U.S. Cl..................................... 136/65; 75/167
[51] Int. Cl.²........................................ H01M 35/04
[58] Field of Search ................... 136/57, 36, 26, 65; 75/167, 166 R

[56] References Cited
UNITED STATES PATENTS

| | | | |
|---|---|---|---|
| 2,058,231 | 10/1936 | Hull | 75/167 |
| 2,264,252 | 11/1941 | Shoemaker | 75/167 |
| 2,288,635 | 7/1942 | Lyons | 75/167 |
| 2,599,726 | 6/1952 | Schluchter | 75/167 |
| 2,615,768 | 10/1952 | Schluchter | 75/167 |
| 2,794,707 | 6/1957 | Walsh | 75/167 |
| 2,860,969 | 11/1958 | Walsh | 75/167 |
| 3,447,969 | 6/1969 | Tudor et al. | 136/26 |
| 3,705,029 | 12/1972 | Foerster | 75/167 |

*Primary Examiner*—John H. Mack
*Assistant Examiner*—C. F. Lefevour
*Attorney, Agent, or Firm*—Holman & Stern

[57]            ABSTRACT

An alloy for use in the manufacture of battery plate grids for lead-acid batteries, the alloy having the following composition by weight:

| | | | |
|---|---|---|---|
| Calcium | 0.05% | – | 0.12% |
| Aluminium | 0.005% | – | 0.1% |
| Lead | remainder. | | |

4 Claims, No Drawings

BATTERY PLATE GRIDS FOR LEAD-ACID BATTERIES

This is a continuation of application Ser. No. 315,402, filed Dec. 15, 1972, now abandoned.

This invention relates to battery plate grids for lead-acid batteries.

Conventionally, battery plate grids for lead-acid batteries are cast from lead alloyed with a small amount of antimony to increase the strength of the grid. The use of antimony for this purpose is, however, undesirable since antimony produces a self discharge of the battery and also is expensive. To overcome the disadvantages of using antimony, it has been suggested to cast grids from alloys of lead and calcium, but these alloys have in general proved unsatisfactory for the production of grids since the casting operation must take place in a protective atmosphere, such as forming gas, and also the resultant grids tend to be soft. It has, however, now been found that grids of sufficiently high strength to be self-supporting can be cast from lead alloyed with small amounts of calcium and aluminium without the use of a protective atmosphere during the casting operation. Furthermore it has been found that lead/calcium/aluminium alloys can be cast into grids at lower tempertures than alloys of lead and calcium alone.

Accordingly, in one aspect, the invention resides in an alloy for use in the manufacture of battery plate grids for lead-acid batteries, the alloy having the following compsition by weight:

| Calcium | 0.05% | – | 0.12% |
| Aluminium | 0.005% | – | 0.1% |
| Lead | remainder. | | |

Preferably, the composition of the alloy by weight is:

| Calcium | 0.065% | – | 0.095% |
| Aluminium | 0.005% | – | 0.03% |
| Lead | remainder | | |

Most preferably, the alloy contains between 0.075 and 0.09 percent by weight of calcium and no more than 0.02 percent by weight of aluminium.

Preferably, the casting operation is carried out in air.

Conveniently, the alloy is produced by mixing with molten lead an alloy of lead and aluminium either in the solid or molten state and then adding to this mixture an alloy of lead and calcium in the solid state.

Alternatively, the alloy is produced by mixing a molten alloy of lead and aluminium with an alloy of lead and calcium in the solid state.

In one example of the invention, to manufacture a battery plate grid for a lead-acid battery an alloy of lead with 2 percent by weight of calcium was initially produced. The alloy was prepared by melting lead in a crucible at a temperature of 650°C and in an atmosphere of forming gas and then introducing calcium hydride into the molten lead, a perforated crucible situated within the body of the molten lead serving to retain the calcium hydride below the surface of the lead. At the temperature of the molten lead, the calcium hydride decomposed to produce gaseous hydrogen and metallic calcium, the latter reacting with the lead to form the required lead/calcium alloy. The gaseous hydrogen produced by the decomposition of the calcium hydride bubbled through the melt to atmosphere and thereby served to agitate the melt and help prevent oxidation of the lead-calcium alloy.

A further quantity of lead was then alloyed with 0.2 percent by weight of aluminium by melting lead in an atmosphere of forming gas at 700° and then introducing aluminium into the molten lead. An appropriate quantity of thin molten lead/aluminium alloy was then mixed with molten lead and to this mixture was added a predetermined amount of the above lead/calcium alloy in solid-form so as to produce a lead/calcium/aluminium alloy containing 0.08 percent by weight calcium, and 0.02 percent by weight aluminium, the remainder being lead. The molten alloy was then cast into battery plate grids in air at 550°C. The casting operation was performed using a grid casting machine sold by TBS Engineering Limited of Cheltenham, which was a type of machine conventionally employed for casting 6 percent antimonial lead grids. The machine was provided with water cooling for the grid mould or chill so as to ensure that grid-defining face of the mould remained at a substantially uniform temperature in the range 150° – 250°C, and preferably at 175°C. Also the mould was coated with a thermal barrier layer, such as cork, having a controlled thickness of about 0.005 inch so as to ensure that the molten grid material cooled at a controlled rate. With this arrangement it was found to be possible to cast satisfactory grids having an overall thickness of between 0.055 and 0.110 inch, a convenient casting rate being 17 grids per minute.

In a second example, an alloy of lead with 0.0104 percent by weight of aluminium was produced as in the previous example and to 100 lbs of this molten alloy was added in solid form, 3.9 lbs of the two percent calcium/lead alloy using the previous example. The resultant alloy contained in addition to lead, 0.075 percent by weight of calcium and 0.01 percent by weight of aluminium and was found to produce satisfactory cast grids.

In a further example, an alloy of lead with 0.2 percent by weight of aluminium was produced as in the first example. 2.67 lbs of this alloy and 4.815 lbs of the lead/calcium alloy used previously were then added in solid form to 100 lbs of molten lead so as to produce a final lead alloy containing 0.09 percent by weight of calcium and 0.005 percent by weight of aluminium. Again this alloy was found to produce satisfactory battery plate grids.

It is to be appreciated that, in producing battery plate grids for lead-acid batteries, by the method of the invention, lead/calcium/aluminium alloys having compositions other than that of the above example can be employed, provided the compositions lie within the following range:

| Calcium | 0.05% | – | 0.12% by weight |
| Aluminium | 0.005% | – | 0.1% by weight |
| Lead | remainder | | | or more preferably the range:

| Calcium | 0.065% | – | 0.095% by weight |
| Aluminium | 0.005% | – | 0.03% by weight |
| Lead | remainder | | |

The most preferred condition for the alloy is:

| Calcium | 0.075% | – | 0.09% by weight |
| Aluminium | 0.005% | – | 0.02% by weight |
| Lead | | | remainder | since it is found that alloys having this composition have good castability and low creep in service and further it is found that grids produced from these alloys show insignificant interdendritic corrosion in use. In some cases, however, it may be necessary, before using grids cast from these alloys, to allow the grids to stand for a period so that they age harden.

I claim:
1. An alloy for use in the manufacture of battery plate grids for lead-acid batteries, the alloy consisting essentially of, by weight:

| | | | |
|---|---|---|---|
| Calcium | 0.05% | – | 0.12% |
| Aluminium | 0.005% | – | 0.1% |
| Lead | remainder. | | |

2. An alloy for use in the manufacture of battery plate grids for lead-acid batteries, the alloy consisting essentially of, by weight:

| | | | |
|---|---|---|---|
| Calcium | 0.065% | – | 0.095% |
| Aluminium | 0.005% | – | 0.03% |
| Lead | remainder. | | |

3. An alloy for use in the manufacture of battery plate grids for lead-acid batteries, the alloy consisting essentially of, by weight:

| | | | |
|---|---|---|---|
| Calcium | 0.075% | – | 0.09% |
| Aluminium | 0.005% | – | 0.02% |
| Lead | remainder. | | |

4. A battery plate grid for a lead-acid battery produced from an alloy as claimed in claim 1.

* * * * *